(12) United States Patent
Cacciaguerra

(10) Patent No.: US 9,315,263 B2
(45) Date of Patent: Apr. 19, 2016

(54) METHOD OF AUTOMATICALLY TRIGGERING AN EMERGENCY BUOYANCY SYSTEM FOR A HYBRID HELICOPTER

(71) Applicant: AIRBUS HELICOPTERS, Marignane, Cedex (FR)

(72) Inventor: Bruno Cacciaguerra, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 44 days.

(21) Appl. No.: 14/070,658

(22) Filed: Nov. 4, 2013

(65) Prior Publication Data

US 2014/0319265 A1  Oct. 30, 2014

(30) Foreign Application Priority Data

Nov. 14, 2012 (FR) ..................................... 12 03050

(51) Int. Cl.
| | |
|---|---|
| *B64C 25/56* | (2006.01) |
| *B64D 25/18* | (2006.01) |
| *B64C 27/22* | (2006.01) |
| *B64C 27/26* | (2006.01) |
| *B64C 27/04* | (2006.01) |
| *B64C 25/32* | (2006.01) |

(52) U.S. Cl.
CPC ................ *B64C 25/56* (2013.01); *B64C 27/22* (2013.01); *B64C 27/26* (2013.01); *B64D 25/18* (2013.01); *B64C 27/04* (2013.01); *B64C 2025/325* (2013.01)

(58) Field of Classification Search
CPC ........ B64C 25/56; B64C 27/26; B64C 27/22; B64C 2025/325; B64C 27/04; B64D 25/18
See application file for complete search history.

(56) References Cited

U.S. PATENT DOCUMENTS

| 5,765,778 A | 6/1998 | Otsuka | |
|---|---|---|---|
| 2003/0164424 A1* | 9/2003 | Smith et al. | 244/105 |
| 2011/0276232 A1* | 11/2011 | Filias | 701/45 |
| 2012/0132741 A1 | 5/2012 | Certain et al. | |
| 2013/0327890 A1* | 12/2013 | Lyons | 244/107 |

FOREIGN PATENT DOCUMENTS

| EP | 2457826 | 5/2012 |
|---|---|---|
| FR | 666671 | 10/1929 |
| FR | 1100863 | 9/1955 |
| FR | 1368083 | 7/1964 |
| FR | 2967972 | 6/2012 |
| GB | 895590 | 5/1962 |
| WO | 2012113038 | 8/2012 |

OTHER PUBLICATIONS

Search Report for FR 1203050, Dated Jun. 24, 2013, 8 Pages.

* cited by examiner

*Primary Examiner* — Valentina Xavier
(74) *Attorney, Agent, or Firm* — Brooks Kushman P.C.

(57) ABSTRACT

A method of automatically triggering an emergency buoyancy system (10) for a hybrid helicopter (20) having a fuselage (21), two half-wings (23, 23'), and two propulsive propellers (24, 24'). During the method, said emergency buoyancy system (10) is primed, and then if a risk of said hybrid helicopter (20) ditching is detected, two retractable wing undercarriages (28, 28') are deployed, each wing undercarriage (28, 28') being fastened under a respective half-wing (23, 23') and being provided with at least one immersion sensor (16). Finally, if the beginning of said hybrid helicopter (20) ditching is detected, at least one main inflatable bag (11, 11') 7B suitable for being arranged under such fuselage (21) and at least one secondary inflatable bag (12, 12') suitable for being arranged under each half-wing (23, 23') are inflated so as to ensure that said hybrid helicopter (20) floats in stable manner.

17 Claims, 3 Drawing Sheets

METHOD OF AUTOMATICALLY TRIGGERING AN EMERGENCY BUOYANCY SYSTEM FOR A HYBRID HELICOPTER

CROSS REFERENCE TO RELATED APPLICATION

This application claims priority to French patent application FR 12 03050 filed on Nov. 14, 2012,the disclosure of which is incorporated in its entirety by reference herein.

BACKGROUND OF THE INVENTION (1) Field of the Invention

The present invention lies in the technical field of buoyancy systems enabling an aircraft to ditch on water. The present invention relates to a method of automatically triggering an emergency buoyancy system for an aircraft and in particular for a hybrid helicopter. The present invention also relates to an emergency buoyancy system that implements the method, and to a hybrid helicopter including such a system.

(2) Description of Related Art

An emergency buoyancy system contributes to enabling an aircraft such as a helicopter to float in stable manner in the event of ditching on water, in particular so as to enable the occupants of the aircraft to evacuate it. Aircraft used for missions involving transporting people over the sea are in principle fitted with such an emergency buoyancy system.

Aviation operating regulations require in particular that helicopters used for transporting passengers and overflying large stretches of water to demonstrate their ability to ditch on water. Ditching is the helicopter making contact with the surface of the water while also keeping the helicopter balanced on the surface of the water. This balance must be ensured while the main rotor of the helicopter is still rotating, and throughout the entire transient stage of stopping the main rotor, and finally after the main rotor has stopped.

As a general rule, an emergency buoyancy system comprises a plurality of floats situated in the bottom portion of the aircraft fuselage. These floats are generally inflatable bags that are inflated by one or more fluid generators, which generators may be tanks of gas under pressure or they may be of the pyrotechnic type, for example.

On present aircraft, inflation of the floats may be controlled manually by the pilot or the copilot of the aircraft, or it may be triggered automatically as a result of one or more immersion sensors detecting that the aircraft is ditching by coming into contact with water. Nevertheless, the buoyancy system must initially be primed using a dedicated control button, where priming is performed when overflying the sea. The purpose of priming the buoyancy system is to limit any risk of untimely triggering.

For aircraft having rotating elements, it is preferable to ensure that the rotating elements do not come into contact with the surface of the water when ditching. If they come into contact with the surface of the water, there is a risk of some or all of these rotating elements breaking up and being projected, which can then give rise to major damage to the aircraft and to its emergency buoyancy system, and above all can lead to severe injury of the occupants of the aircraft.

With a conventional helicopter, a main rotor for providing lift or even propulsion is located sufficiently high relative to the aircraft, generally being above the fuselage, to minimize any risk of interference between the main rotor and the surface of the water.

In contrast, a hybrid helicopter has at least one rotating element for performing the propulsion and anti-torque function, such as a propulsive propeller, which element is in a position that makes it possible for it to come into contact with the surface of the water on ditching. For example, a hybrid helicopter may have two half-wings on either side of the fuselage, with each half-wing supporting a respective propulsive propeller.

Document FR 1 368 083 describes a helicopter having a single main rotor and a safety device to enable that helicopter to float on water. Such a safety device comprises a float that is permanently inflated and that is situated in the tail of the helicopter, together with two floats that are not inflated and that are positioned in the hubs of two landing gear wheels. That device also has two immersion sensors for triggering inflation of the floats by means of a gas generator.

Document FR 2 967 972 is also known, which describes a method of controlling an emergency buoyancy system for limiting the risk of untimely triggering. Such a buoyancy system has at least one float and means for inflating the float, together with priming means for activating the means for inflating the float, such that a float inflation order can subsequently be given manually, e.g. by the pilot, or else automatically by at least two immersion sensors.

In that method, the pilot or the copilot has a predetermined length of time to confirm or override an inflation order, thereby avoiding untimely inflation of each float. Nevertheless, certain conditions that correspond to a high probability of ditching lead to each of the floats being inflated immediately without waiting for pilot confirmation.

Also known is document FR 666 671,which describes an airplane having two wings, a central float, and two lateral floats positioned under the ends of each wing, thereby transforming that airplane into a hydroplane. That airplane also has landing gear under the central float that is provided with an axle having two wheels that also has a tail skid. The axle may be raised or lowered, thereby enabling the airplane respectively to alight on a water surface or else to land on a runway.

Furthermore, document FR 1 100 863 describes an airplane having a takeoff and landing system provided with a main single-track undercarriage, additional wing-tip undercarriages, and an auxiliary device that remains on the ground. The additional undercarriages are positioned under the wings and each of them has a retractable skid. The single-track main undercarriage has a steerable and retractable front wheel and a central skid that is also retractable. The auxiliary device is constituted by an axle and twin wheels that are positioned under the central skid during takeoff and that remain on the ground after takeoff. When landing, the airplane lands directly on the front wheels, the central skid, and the additional undercarriages.

Also known is the Sea Harrier® airplane that has additional undercarriages under each of its wings, also referred to as "outriggers", suitable for stabilizing the airplane, but only on the ground.

Document GB 895 590 describes a helicopter having a main rotor, two half-wings, and two propulsive propellers mounted on respective half-wings and driven in rotation by respective independent and dedicated turbines. Each half-wing is downwardly foldable at its end, beyond the propulsive propeller. In addition, a fuel tank is positioned at the end of each half-wing and can act as a float when the ends of the half-wings are folded down, the helicopter then being on a water surface.

According to document U.S. Pat. No. 5,765,778,an aircraft has an emergency device made up of a plurality of auxiliary engines and inflatable balloons. The auxiliary engines are steerable and can act in particular to exert vertical thrust so as to reduce the rate of descent of the aircraft in the event of an emergency landing. The inflatable balloons are positioned in a bottom zone of the fuselage of the aircraft and they can be inflated instantly in order to damp the impact of such an emergency landing. The auxiliary engines also include protection enabling them also to damp the impact with the ground in the event of said emergency landing.

Finally, document WO 2012/113038 describes a buoyancy system having at least one inflatable bag, an inflation device, and a detection and activation system. The buoyancy system thus makes it possible to increase the buoyancy of the aircraft, in particular so as to have sufficient time available to enable the occupants of the aircraft to evacuate it in the event of ditching on water.

BRIEF SUMMARY OF THE INVENTION

An object of the present invention is thus to propose a method of triggering an emergency buoyancy system that makes it possible to avoid or to minimize contact between a rotating element of an aircraft, such as a main rotor or indeed a propulsive propeller, and the surface of the water while ditching.

According to the invention, an emergency buoyancy system comprises at least one main inflatable bag suitable for being arranged in the bottom portion of the fuselage, and a plurality of immersion sensors.

A method of the invention for triggering an emergency buoyancy system is for use in an aircraft having in particular a fuselage and two half-wings situated on either side of the fuselage, together with at least one propulsive propeller. Each propulsive propeller may for example be mounted on a respective half-wing.

More particularly, the method of triggering an emergency buoyancy system is for a hybrid helicopter having a fuselage, a main rotor providing lift and possibly also propulsion for the hybrid helicopter, and two half-wings situated on either side of the fuselage, together with at least one propulsive propeller. The hybrid helicopter preferably has two propulsive propellers, one mounted on each of the half-wings.

During this method of triggering an emergency buoyancy system, the following steps are performed:

arranging at least one secondary inflatable bag under each half-wing of the aircraft;

arranging at least one retractable wing undercarriage under each half-wing, each wing undercarriage being provided with at least one immersion sensor;

priming the emergency buoyancy system;

determining whether there is a risk of the aircraft ditching;

deploying each wing undercarriage when a risk of ditching is established;

using at least one immersion sensor to determine the beginning of the aircraft ditching; and inflating each main and secondary inflatable bag when the ditching is established.

Firstly, in order to be operational, the emergency buoyancy system needs to be primed. In order to limit any risk of untimely and accidental inflation of each bag, the emergency buoyancy system is primed only when the aircraft is overflying the sea. Thus, while overflying land or when the aircraft is not in flight, the emergency buoyancy system is not primed, and is therefore not operational. Consequently, there is no risk of the bags of the emergency buoyancy system inflating accidentally.

Once inflated, each main bag may optionally provide sufficient buoyancy for the aircraft on ditching. Nevertheless, it is necessary to obtain good roll stability by minimizing the impact of the weight of the aircraft and to avoid or minimize contact between each propulsive propeller and the surface of the water. For this purpose, at least one secondary inflatable bag is arranged under each half-wing of the aircraft. Thus, each inflated secondary bag acts like a float located under each half-wing, preferably close to its propulsive propeller, and enables each propulsive propeller to remain above the surface of the water, while also providing the aircraft that is floating on the surface of the water with great stability in roll. There must be sufficient space between each propulsive propeller and the surface of the water to allow for potential roughness of the water surface in order to keep each propulsive propeller as well as possible out of the water. For example, the shortest distance between each propulsive propeller and the surface of the water for the aircraft floating on a still plane surface is 30 centimeters (cm).

Furthermore, the beginning of the aircraft ditching is determined by means of immersion sensors. These immersion sensors are traditionally positioned under the fuselage of the aircraft, e.g. in bays for receiving landing gear wheels, assuming they are retractable into the fuselage, or else on the landing gear itself. Thus, the immersion sensors are immersed from the beginning of the aircraft ditching, whereupon they indicate that they have been immersed. This means that the immersion sensors make it possible to determine the beginning of the aircraft ditching. Thereafter, each main or secondary bag is inflated in order to provide the aircraft with buoyancy.

Nevertheless, given the short vertical distance between the bottom of the fuselage and the low point of the path followed by the tips of the blades of the propulsive propellers, the immersion sensors located under the fuselage of the aircraft do not enable the beginning of ditching to be detected soon enough for the bags to be inflated before the propellers touch the water. Some immersion sensors must therefore be located lower down, i.e. at a level that is below the bottom surface of the fuselage.

For this purpose, the emergency buoyancy system includes at least one wing undercarriage under each half-wing of the aircraft. Each wing undercarriage is sufficiently tall for part of it to come into contact with the water before the propulsive propeller does. At least one immersion sensor is thus positioned on the wing undercarriage, preferably at one end thereof, thereby making it possible to determine the beginning of the aircraft ditching. Positioning the immersion sensors in this way advantageously enables the beginning of ditching to be detected even if the aircraft has a non-zero roll angle.

At least one immersion sensor present on a wing undercarriage is then immersed, and consequently indicates that it has been immersed, when that wing undercarriage comes into contact with the water and even before the fuselage of the aircraft makes contact with the water. Nevertheless, as mentioned above, since ditching involves the aircraft making contact with the surface of the water, it can be considered that the moment at which the aircraft ditches is when the wing undercarriage comes into contact with the water. These immersion sensors thus make it possible to detect that ditching of the aircraft has begun, before either one of the propulsive propellers can come into contact with the surface of the water. Consequently, the main and secondary bags are inflated so as to provide the aircraft with buoyancy and so as to avoid or at least minimize any contact between each propulsive propeller and the surface of the water.

Advantageously, each wing undercarriage may also be used for landing. It is entirely possible for the aircraft to need to land with a considerable roll angle, in particular in the event of a strong side wind. By way of example, this roll angle may lie in the range 10° to 16° for a side wind lying in the range 15 knots (kt) to 35 kt. Under such conditions, effective means for preventing contact between a propulsive propeller and the ground is to install a wing undercarriage. Since each wing undercarriage is sufficiently tall to make contact with the water before the propulsive propeller makes such contact, the same applies on the ground. This serves to protect the propeller when landing.

Furthermore, this phenomenon is accentuated when landing on sloping ground or on a ship, e.g. in rough weather.

In order to make such landing easier, a wheel or a skid may be positioned at the end of the wing undercarriage. Each immersion sensor can then be positioned on that wheel or skid.

With each secondary bag situated under a half-wing, the bag may for example be fastened to a wing undercarriage, e.g. in a hub of a wheel of that wing undercarriage. Thus, each bag is stowed in a folded configuration in the hub of the wheel of each wing undercarriage and it is expelled on being inflated so as to be inflated outside the hub of the wheel.

Each secondary bag may also be fastened to a hinged support that is connected to the wing undercarriage. The hinged support then deploys as soon as the beginning of ditching is detected. The hinged support may be deployed while simultaneously inflating each secondary bag, or it may be deployed immediately before inflating each secondary bag.

Each secondary bag may also be fastened directly to a half-wing. Under such circumstances, each secondary bag, when inflated, needs to be of a size that is sufficient for maintaining enough space between each propulsive propeller and the surface of the water.

In order to limit the size of each secondary bag, each half-wing may be hinged close to its end in order to be capable of folding downwards, i.e. towards the surface of the water. Under such circumstances, each secondary bag fastened to the end of each half-wing may be of smaller size.

The landing gear of the aircraft may include a main undercarriage that is retractable into the fuselage, e.g. being made up of at least one right wheel and at least one left wheel, together with a secondary undercarriage that is likewise retractable into the fuselage and made up for example of at least one steerable wheel. The secondary undercarriage may be placed in front of or behind the main undercarriage.

The landing gear of the aircraft may also be in a tricycle configuration that is fixed, i.e. that is not retractable, having two wheels at the front and one steerable wheel at the rear, for example.

Furthermore, in order to avoid disturbing the streamlining of the aircraft and in order to avoid generating aerodynamic drag in flight, it is advantageous for each wing undercarriage to be housed in its wing in flight. Furthermore, each wing undercarriage is then protected from any impact that might occur in flight and that could risk damaging it.

In contrast, in order to detect ditching of the aircraft by means of an immersion sensor positioned on each wing undercarriage, it is necessary for each wing undercarriage to be deployed before ditching. Such deployment of each wing undercarriage may be partial or complete, depending on the position of each immersion sensor on each wing undercarriage and on the length of each wing undercarriage. Each wing undercarriage then takes up a position appropriate for ditching that enables each immersion sensor it includes to detect the beginning of ditching before a propulsive propeller comes into contact with the surface of the water. Each secondary bag will be deployed from this position appropriate for ditching of each wing undercarriage. In contrast, when landing, each wing undercarriage should be deployed in full.

Advantageously, the method makes it possible to determine that there is a risk of the aircraft ditching. Thereafter, when this risk is established, each wing undercarriage is deployed to its position appropriate for ditching. Naturally, the emergency buoyancy system must previously have been primed so that each wing undercarriage is deployed as soon as the risk of ditching is established.

For example, a risk of the aircraft ditching is established when the aircraft is lower than a predetermined height. The term "height" is used to mean the distance in the terrestrial gravity direction between the aircraft and the surface the aircraft is overflying. Thus, as soon as the aircraft comes close to the surface of the water, i.e. as soon as it reaches a height that is less than a predetermined height, a risk of the aircraft ditching is established, and consequently each wing undercarriage is deployed. By way of example, the predetermined height may be 10 meters (m).

Nevertheless, it is possible in an optional operation of the method, to allow each wing undercarriage to be deployed only after that has been validated by the pilot of the aircraft. In this optional operation, the method informs the pilot, e.g. by means of a visible and/or audible warning message, that a risk of the aircraft ditching is established. The pilot can then validate by using validation means, such as a pushbutton, if the pilot is of the opinion that there is indeed a risk of ditching, thus allowing each of the wing undercarriages to be deployed.

This method may include one or more of the following characteristics.

In order in particular to limit any risk of untimely and accidental inflation of the bags of the emergency buoyancy system, it is determined that the aircraft is ditching when at least two immersion sensors of the emergency buoyancy system indicate immersion. Thus, if an immersion sensor has failed and signals ditching in erroneous manner, the bags will not be inflated.

As mentioned above, if the aircraft has a non-zero roll angle, it can happen that ditching is determined by means of at least one immersion sensor positioned on a wing undercarriage. Under such circumstances, in order to limit any risk of untimely and accidental inflation of the bags of the emergency buoyancy system, it is determined that the aircraft is ditching when at least two immersion sensors of a wing undercarriage indicate immersion. Under such circumstances, in order to accommodate a failure of a sensor, each wing undercarriage includes at least three immersion sensors.

In addition to a method, the present invention provides an emergency buoyancy system that implements the method.

Such an emergency buoyancy system is for an aircraft having a fuselage and two half-wings situated on either side of the fuselage, and in particular for a hybrid helicopter.

The emergency buoyancy system has at least one main inflatable bag suitable for being arranged under the fuselage, at least one secondary inflatable bag suitable for being arranged under each half-wing, and a plurality of immersion sensors for determining that the aircraft is ditching. Furthermore, it also includes at least one retractable wing undercarriage provided with at least one immersion sensor and suitable for being arranged under each half-wing.

This emergency buoyancy system suitable for implementing the above-mentioned method also comprises:

priming means for priming the emergency buoyancy system;

anticipation means for determining whether there is a risk of the aircraft ditching;

deployment means for deploying each wing undercarriage;

trigger means connected to the priming means to order the inflation of the inflatable bags; and an inflation system having at least one fluid generator for inflating the inflatable bags, the inflation system being connected to the trigger means.

The priming means are manual, e.g. a switch or a pushbutton, and enable the pilot or the copilot of the aircraft to activate the emergency buoyancy system as soon as a large extent of water is being overflown.

By way of example, the anticipation means may comprise a height sensor for sensing the height of the aircraft relative to the surface of the water, with a risk of ditching being established when the aircraft is below a predetermined height.

When a risk of ditching is established, the deployment means enable each wing undercarriage to be deployed, i.e. enable the undercarriage to be extracted from its retracted position within each half-wing and extended to its position appropriate for ditching, thereby enabling ditching to be detected with the help of each of the immersion sensors. By way of example, the deployment means may comprise a hydraulic actuator or a set of hydraulic actuators for moving each wing undercarriage.

The deployment means also make it possible to deploy each wing undercarriage in full when performing a landing.

Furthermore, each secondary inflatable bag includes fastener means. In one embodiment of the invention, the fastener means enable the secondary inflatable bag to be fastened to a wing undercarriage, e.g. in a hub of a wheel of the wing undercarriage.

In another example, the fastener means enable the secondary inflatable bag to be fastened to a hinged support connected to the wing undercarriage. The hinged support is deployed as soon as the beginning of ditching is detected.

In a variant, the fastener means of a secondary inflatable bag enable the secondary inflatable bag to be fastened to a half-wing.

Furthermore, in order to accommodate a possible failure of an immersion sensor, each wing undercarriage has at least three immersion sensors. In addition, in order to limit the risk of untimely or accidental triggering of the inflation of each main bag and of each secondary bag, e.g. as a result of a faulty immersion sensor, the trigger means order inflation of the bag when at least two immersion sensors of the emergency buoyancy system indicate immersion.

Finally, the inflation system must enable the inflatable bags to be inflated very fast, or even practically instantaneously, as soon as ditching of the aircraft is detected. The inflation system may comprise a plurality of fluid generators, e.g. one per inflatable bag. These generators are preferably of the pyrotechnic type; however they could equally well be constituted by tanks of gas under pressure.

The emergency buoyancy system of the invention may optionally include validation means, such as a pushbutton, so as to enable the pilot to implement an optional procedure that involves validating deployment of the wing undercarriages after a risk of the aircraft ditching has been established.

The emergency buoyancy system of the invention may also include manual control means to enable the pilot or the copilot to order inflation of each main bag and of each secondary bag manually and directly, with such a system being activated beforehand by using the priming means.

The wing undercarriages may be deployed automatically on the pilot taking action on such manual control means, or it may be necessary for the pilot to take prior action in order to order deployment of the wing undercarriages.

The manual control means, which may be in the form of a switch or a pushbutton, for example, enable each main and secondary bag to be inflated before the aircraft makes contact with the surface of the water, or else make it possible to mitigate a failure of the immersion sensors.

The present invention also provides a hybrid helicopter having such an emergency buoyancy system. The hybrid helicopter has a fuselage, a main rotor situated above the fuselage, two half-wings situated on either side of the fuselage, and at least one propulsive propeller. The hybrid helicopter preferably has two propulsive propellers, situated on either side of the fuselage.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

Elements that are present in more than one of the figures are given the same references in each of them.

DETAILED DESCRIPTION OF THE INVENTION

Figure 1:
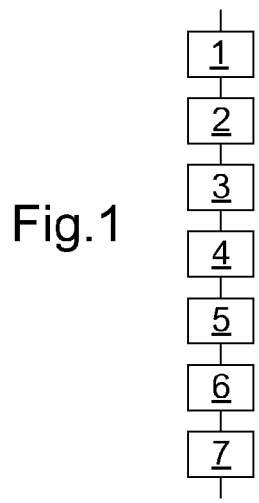
FIG. 1 is an overall diagram of the method of triggering an emergency buoyancy system of the invention.

FIG. 1 describes a method of triggering an emergency buoyancy system 10 for an aircraft 20, and in particular for a hybrid helicopter 20, the method comprising a plurality of steps.

Figure 2:
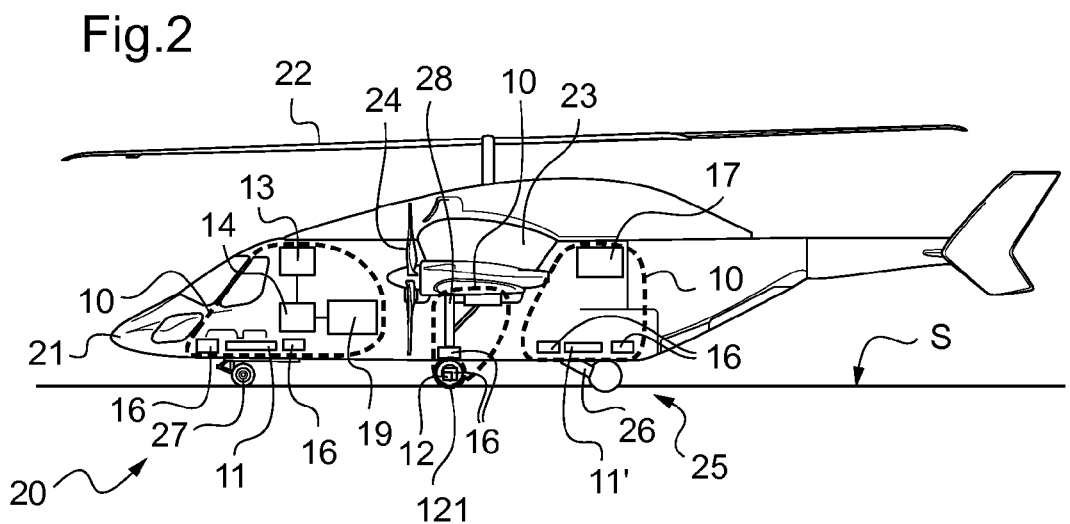
FIGS. 2 and 3 show a hybrid helicopter fitted with an emergency buoyancy system of the invention.
Figure 3:
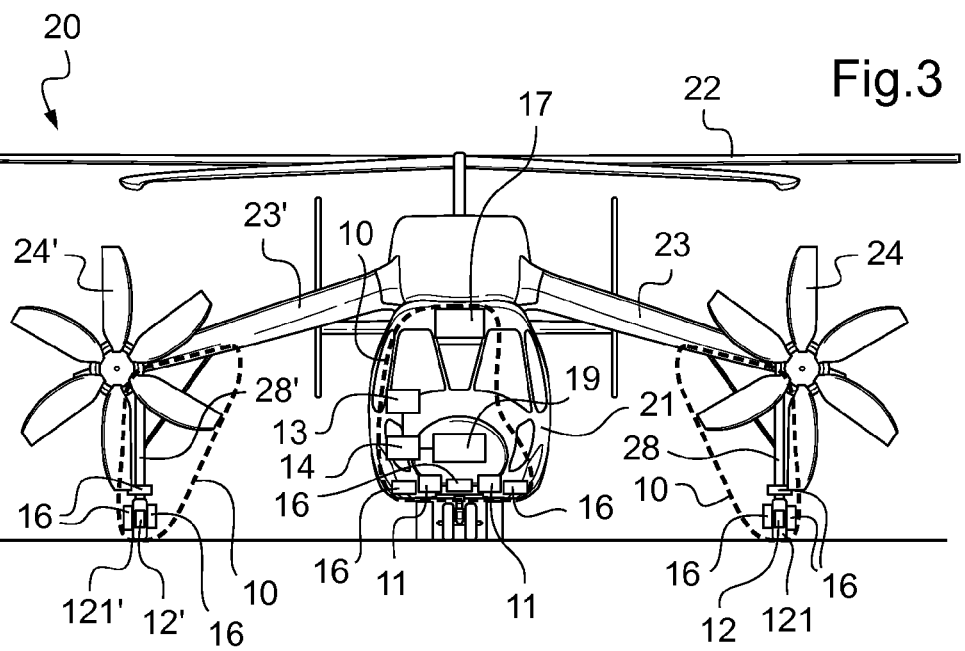

FIGS. 2 and 3 show a hybrid helicopter 20 provided with an emergency buoyancy system 10. The hybrid helicopter 20 is shown standing on the ground S, FIG. 3 being a front view and FIG. 2 being a side view.

Figure 4:
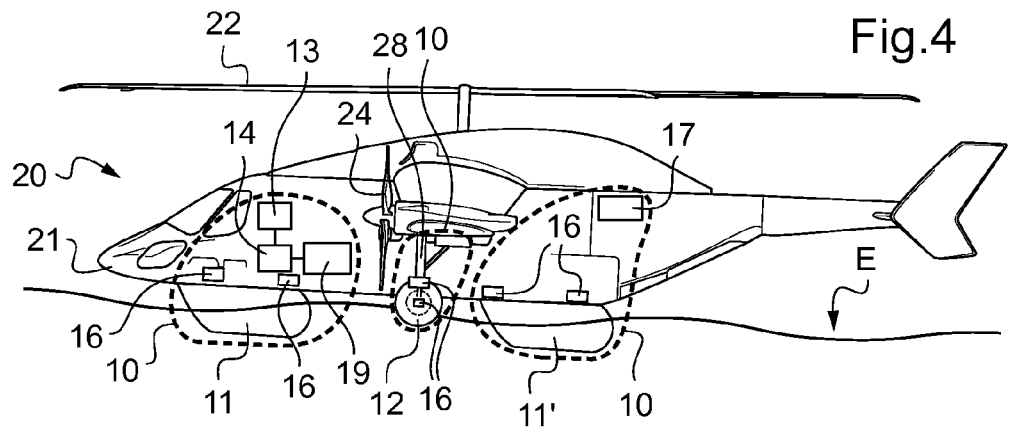
FIGS. 4 to 7C show a hybrid helicopter in which the emergency buoyancy system has been triggered.
Figure 5:
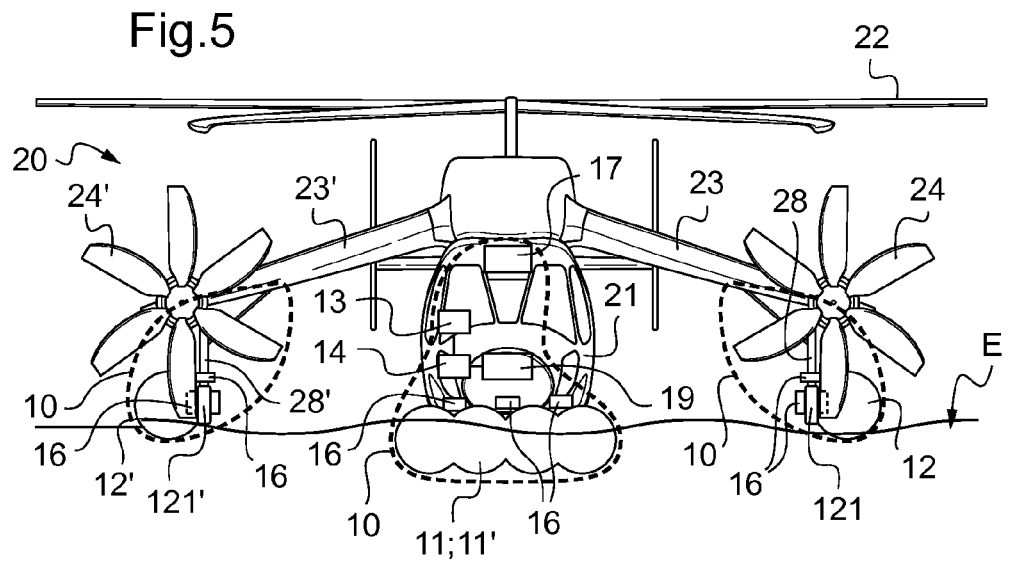
Figure 6:
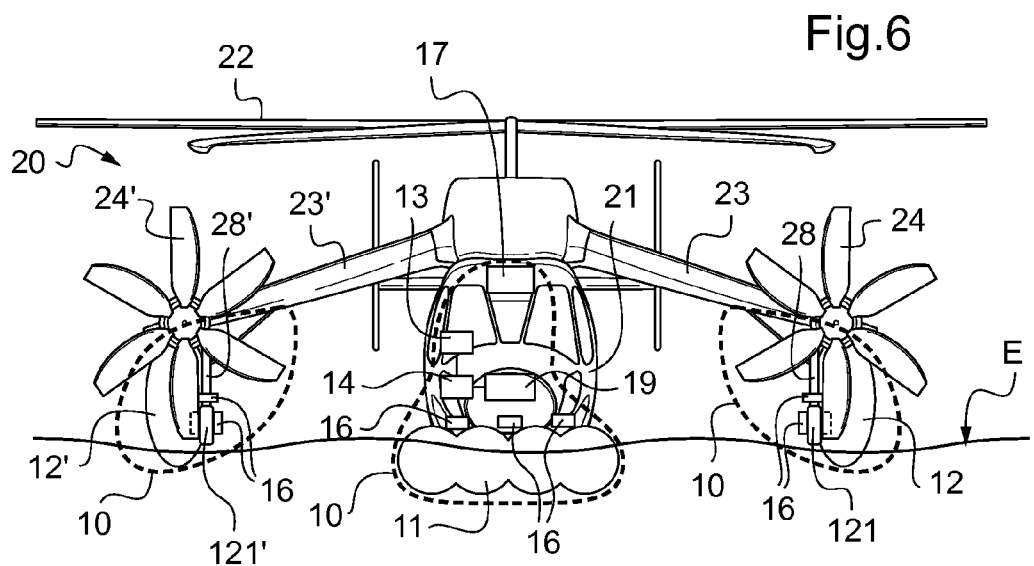

FIGS. 4 to 7 show a hybrid helicopter 20 for which the emergency buoyancy system 10 has been triggered, the hybrid helicopter 20 thus floating on the surface of the water E. FIGS. 5 and 6 are front views while FIGS. 4 and 7 are side views.

Such a hybrid helicopter 20 as shown in FIGS. 2 to 7 comprises a fuselage 21, a main rotor 22 providing lift and possibly also propulsion for the hybrid helicopter 20, and two half-wings 23, 23' situated on either side of the fuselage 21, together with two propulsive propellers 24, 24' mounted on the half-wings 23, 23'.

FIGS. 2 and 3 show landing gear 25 of the hybrid helicopter 20 situated under the fuselage 21 and comprising main landing gear 26 made up of a right wheel and a left wheel together with secondary landing gear 27 made up of two steerable wheels. The secondary landing gear 27 is located under the nose of the fuselage 21, i.e. in a front zone, the main landing gear being situated under the rear zone of the fuselage 21. The main and secondary landing gear 26 and 27 is retractable into the fuselage 21, in order to limit aerodynamic drag therefrom in flight.

The emergency buoyancy system 10 comprises two main inflatable bags 11, 11' arranged in the bottom portion of the fuselage 21, together with a respective secondary inflatable bag 12, 12' arranged under each half-wing 23, 23'. In addition, the emergency buoyancy system 10 includes a wing undercarriage 28, 28' arranged under each half-wing 23, 23' and retractable into each half-wing 23, 23'.

Each secondary inflatable bag 12, 12' also has fastener means. These fastener means serve for example to fasten the secondary inflatable bag 12, 12' to a respective wing undercarriage 28, 28'.

In the embodiment of the invention shown in FIG. 5, the fastener means enable the secondary inflatable bag 12, 12' to be fastened in a hub of a wheel 121, 121' positioned at the end of this wing undercarriage 28, 28'. The main and secondary inflatable bags 11, 11' and 12, 12' are inflated and the wing undercarriage 28, 28' is fully deployed, which corresponds, in this embodiment of the invention, to its position for ditching at sea. This embodiment is also shown in FIG. 3, with the secondary inflatable bags 12, 12' not being inflated.

Figure 7A:
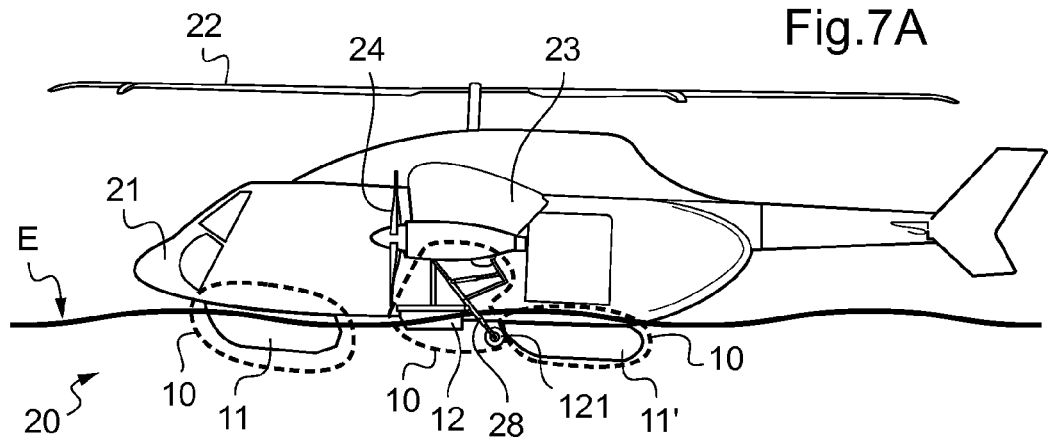
Figure 7B:
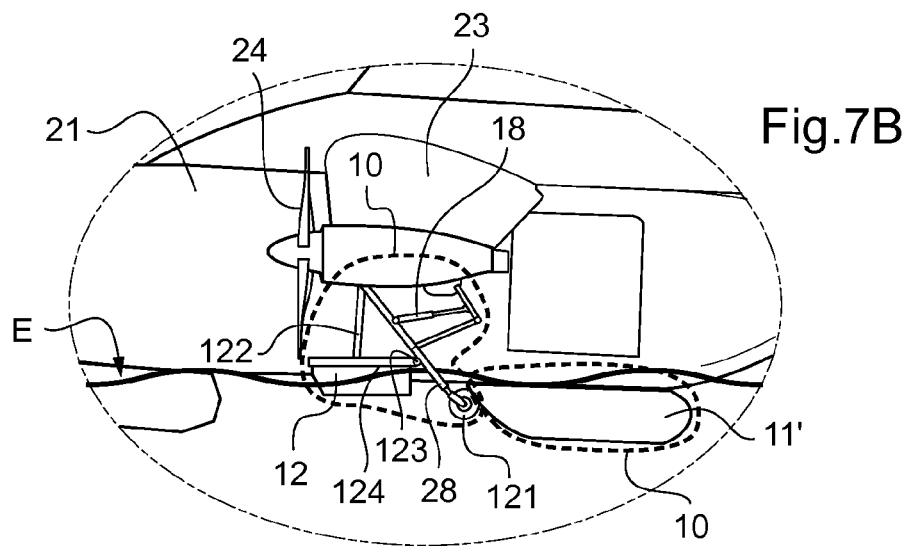
Figure 7C:
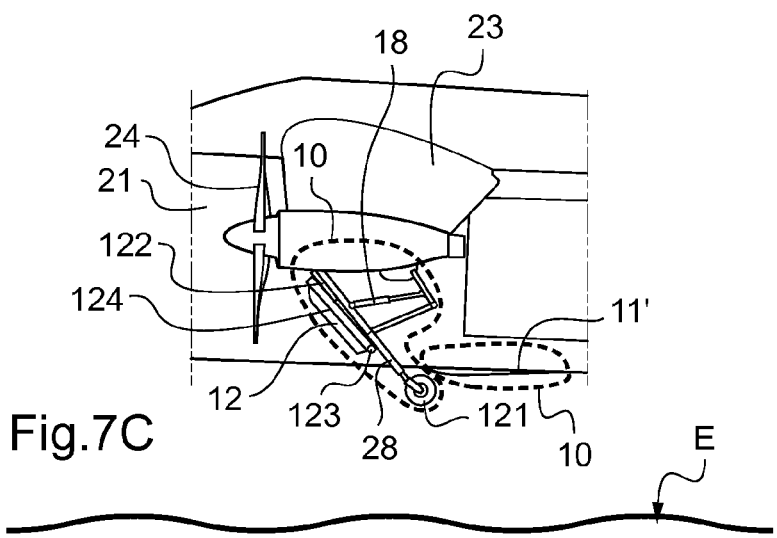

In the variant shown in FIG. 7, the fastener means enable this secondary inflatable bag 12, 12' to be fastened to a hinged support 124 connected to the wing undercarriage 28, 28'. FIG. 7A shows the hybrid helicopter 20 floating on the surface of the water E, after ditching. The main and secondary inflatable bags 11, 11' and 12, 12' are inflated and the wing undercarriage 28, 28' is partially extended, which corresponds in this variant to its position for ditching. FIG. 7B shows a detail of FIG. 7A in the region of the wing undercarriage 28, 28', the hybrid helicopter 20 floating on the surface of the water E, while FIG. 7C shows the same detail of the hybrid helicopter 20 immediately prior to ditching.

In the variant shown in FIG. 6, the fastener means enable this secondary inflatable bag 12, 12' to be fastened to a half-wing 23, 23'.

Furthermore, the emergency buoyancy system 10 has a plurality of immersion sensors 16 for determining the beginning of the hybrid helicopter 20 ditching. Some of these immersion sensors 16 are placed under the fuselage 21 of the hybrid helicopter 20, e.g. in the housings for the landing gear 25. Three immersion sensors 16 are also placed on each wing undercarriage 28, 28', thereby enabling ditching to be detected and consequently enabling each propulsive propeller 24, 24' to be protected.

The positions of the immersion sensors 16 on each wing undercarriage 28, 28' serve to define the position for ditching of these wing undercarriages 28, 28' so as to determine the beginning of ditching and cause the inflatable bags 11, 11' and 12, 12' to inflate before a propulsive propeller 24, 24' comes into contact with the surface of the water E. Each secondary bag 12, 12' is deployed in this ditching position of each wing undercarriage 28? 28'. In contrast, during ditching, each wing undercarriage 28, 28' is fully deployed.

The emergency buoyancy system 10 also comprises:
priming means 13 for priming the emergency buoyancy system 10;
anticipation means 17 for determining whether there is a risk of the hybrid helicopter 20 ditching;
deployment means 18 for deploying each wing undercarriage 28, 28';
trigger means 14 connected to the priming means 13 to order inflation of the inflatable bags 11, 11', 12, 12; and
an inflation system 19 having at least one fluid generator for inflating the inflatable bags 11, 11', 12, 12', the inflation system 19 being connected to the trigger means 14.

The inflation system 19 must enable the main and secondary inflatable bags 11, 11' and 12, 12' to be inflated very quickly or indeed almost instantaneously on detection of the hybrid helicopter 20 ditching. The inflation system 19 may comprise a plurality of fluid generators, e.g. one per inflatable bag 11, 11', 12, 12'. These generators are preferably of the pyrotechnic type, however they could also be constituted by tanks of gas under pressure.

By way of example, the anticipation means 17 comprise a sensor for sensing the height of the hybrid helicopter 20 above the surface of the water E, with a risk of ditching being established when the hybrid helicopter 20 is below a predetermined height relative to this surface of the water E.

In FIG. 7C, the risk of ditching is established, the hybrid helicopter 20 being close to the surface of the water, at a height that is less than the predetermined height. The wing undercarriage 28, 28' has therefore been deployed to its position appropriate for ditching by using the deployment means 18. However, the secondary inflatable bag 12, 12' that is fastened to the hinged support 124 and the main inflatable bag 11' are not inflated, since the beginning of ditching has not been detected.

In FIG. 7B, once ditching has taken place, the secondary and main inflatable bags 12, 12' and 11' have been inflated. Since the wing undercarriage 28, 28' is already in its position appropriate for ditching, the hinged support 124 was also deployed by means of an actuator 122 on being detected the beginning of ditching, the hinged support 124 being connected to the wing undercarriage 28, 28' by a hinge 123.

The method of triggering such an emergency buoyancy system 10 then comprises the following steps, as shown in FIG. 1:
step 1: a secondary inflatable bag 12, 12' is arranged under each half-wing 23, 23' of the aircraft 20;
step 2: a retractable wing undercarriage 28, 28' is arranged under each half-wing of the aircraft 20, each wing undercarriage 28, 28' being provided with at least one immersion sensor 16;
step 3: the emergency buoyancy system 10 is primed;
step 4: it is determined whether there is a risk of the aircraft 20 ditching;
step 5: each wing undercarriage 28, 28' is deployed when a risk of ditching is established;
step 6: at least one immersion sensor 16, and preferably two immersion sensors 16 are used to determine the beginning of the aircraft 20 ditching; and
step 7: each main and secondary inflatable bag 11, 11' and 12, 12' is inflated when ditching is established.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means, without going beyond the ambit of the present invention.

What is claimed is:
1. A method of triggering an emergency buoyancy system for an aircraft having a fuselage and two half-wings situated on either side of the fuselage, the method comprising:
arranging at least one main inflatable bag in the bottom portion of the fuselage;
arranging at least one secondary inflatable bag under each of the two half-wings;
arranging at least one retractable wing undercarriage under each of the two half-wings, each retractable wing undercarriage being provided with at least one immersion sensor;
fastening each secondary inflatable bag to at least one of (i) a hub of a wheel positioned at the end of each wing undercarriage, and (ii) a hinged support connected to the wing undercarriage by a hinge;

priming the emergency buoyancy system;
determining whether there is a risk of the aircraft ditching;
deploying each retractable wing undercarriage from a retracted position to a deployed position when a risk of ditching is determined;
detecting the beginning of an aircraft ditching with at least one of the immersion sensors; and
inflating each main and secondary inflatable bag when the aircraft ditching is detected.

2. The method according to claim 1, wherein determining whether there is a risk of the aircraft ditching comprises determining whether the aircraft is below a predetermined height.

3. The method according to claim 1, wherein each wing undercarriage has at least three immersion sensors, wherein detecting the beginning of the aircraft ditching of is detected by at least two immersion sensors of a wing undercarriage indicating immersion.

4. The method according to claim 1, wherein each wing undercarriage is deployed after a pilot of the aircraft has validated the risk of ditching.

5. An emergency buoyancy system for an aircraft having a fuselage and two half-wings situated on either side of the fuselage, the emergency buoyancy system comprising:
at least one main inflatable bag suitable for being arranged under the fuselage;
at least one secondary inflatable bag suitable for being arranged under each half-wing;
a plurality of immersion sensors for determining the beginning of the aircraft ditching;
at least one retractable wing undercarriage arranged under each half-wing and moveable between a retracted position to a deployed position, each retractable wing undercarriage provided with at least one of the plurality of immersion sensors;
priming means for priming said emergency buoyancy system;
anticipation means for determining whether there is a risk of the aircraft ditching;
deployment means for deploying each wing undercarriage if the risk of the aircraft ditching is determined by the anticipation mean;
a trigger connected to the priming means to order the inflation of the inflatable bags; and
an inflation system having at least one fluid generator for inflating the inflatable bags, the inflation system being connected to the trigger
wherein the retractable wing undercarriage has a deployed height being greater than a radius of a propulsive propeller disposed on each of the two half-wings, wherein the at least one immersion sensor is disposed below the propulsive propeller when the retractable wing undercarriage is in the deployed position.

6. The emergency buoyancy system according to claim 5, wherein the anticipation means comprise a height sensor for sensing the height of the aircraft, the risk of ditching being established when the aircraft is below a predetermined height.

7. The emergency buoyancy system according to claim 5, wherein each secondary inflatable bag is fastened to the retractable wing undercarriage in a hub of a wheel positioned at an end of each wing undercarriage.

8. The emergency buoyancy system according to claim 5, wherein each secondary inflatable bag is fastened to a hinged support, wherein the hinged support is connected to the wing undercarriage by a hinge, the hinged support being deployed by an actuator as soon as the beginning of ditching has been detected.

9. The emergency buoyancy system according to claim 5, wherein each wing undercarriage includes at least three immersion sensors, wherein the inflation system inflates the main and secondary inflatable bags when at least two immersion sensors of one retractable wing undercarriage indicate immersion.

10. The emergency buoyancy system according to claim 5, wherein the emergency buoyancy system includes validation means enabling a pilot of the aircraft to validate the risk of the aircraft ditching.

11. A hybrid helicopter comprising:
a fuselage;
a main rotor situated above the fuselage;
two half-wings situated on either side of the fuselage;
at least one propulsive propeller disposed on each half-wing;
at least one retractable wing undercarriage arranged under each half-wing and moveable between a retracted position to a deployed position; and
an emergency buoyancy system, wherein the emergency buoyancy system comprises:
a main inflatable bag arranged under the fuselage;
a secondary inflatable bag arranged under each half-wing;
at least one immersion sensor disposed on each retractable wing undercarriage for indicating a beginning of the helicopter ditching,
wherein the emergency buoyancy system inflates the main and secondary inflatable bags when the immersion sensor indicates the beginning of the helicopter ditching;
wherein the retractable wing undercarriage has a deployed height being greater than a radius of the propulsive propeller, wherein the at least one immersion sensor is disposed below the propulsive propeller when the retractable wing undercarriage is in the deployed position.

12. The helicopter according to claim 11, wherein the emergency buoyance system includes a sensor for providing a signal indicating there is a risk of the helicopter ditching.

13. The helicopter according to claim 12 wherein the sensor comprises a height sensor for determining whether the helicopter is below a predetermined height, and below the predetermined height, the sensor provides the signal indicating the risk of the helicopter ditching.

14. The helicopter according to claim 12, wherein each wing undercarriage moved to the deployed position by an actuator when the sensor indicates the risk of the helicopter ditching.

15. The helicopter according to claim 12, wherein each secondary inflatable bag is fastened to a hinged support, wherein the hinged support is connected to the retractable wing undercarriage by a hinge, the hinged support being deployed by an actuator as soon as the beginning of ditching has been detected.

16. The helicopter according to claim 11, wherein each wing undercarriage has at least three immersion sensors, wherein the emergency buoyancy system inflates the main and secondary inflatable bags when at least two immersion sensors of one retractable wing undercarriage indicate immersion.

17. The helicopter according to claim 11, wherein each secondary inflatable bag is fastened to the retractable wing undercarriage in a hub of a wheel positioned at an end of each wing undercarriage.

* * * * *